UNITED STATES PATENT OFFICE.

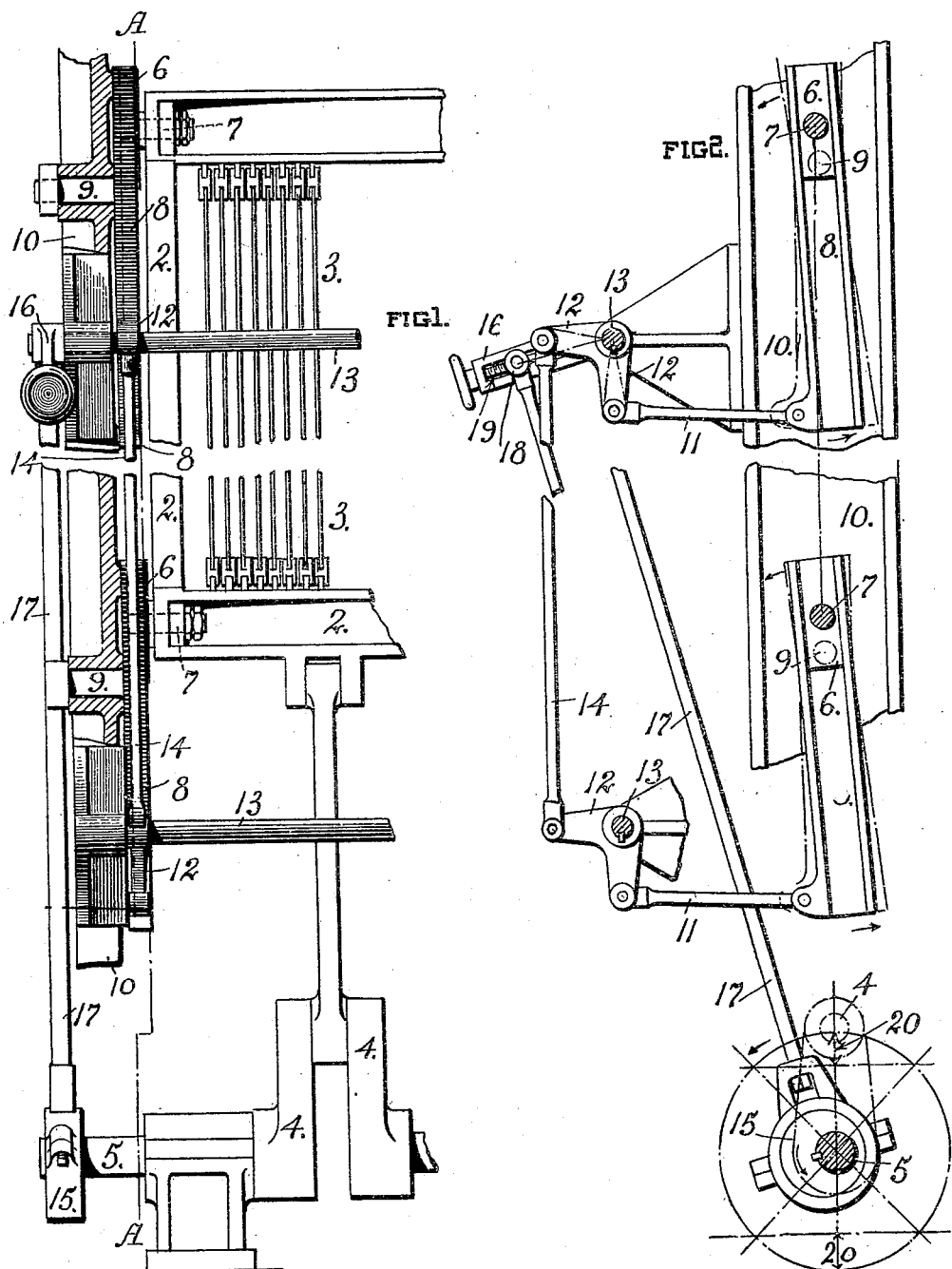

JOHN WARREN BELL, OF VANCOUVER, BRITISH COLUMBIA, CANADA.

GANG-SAW.

931,912.  Specification of Letters Patent.  Patented Aug. 24, 1909.

Application filed January 19, 1909. Serial No. 473,125.

*To all whom it may concern:*

Be it known that I, JOHN W. BELL, a citizen of the Dominion of Canada, residing at Vancouver, in the Province of British Columbia, Canada, have invented new and useful Improvements in Gang-Saws, of which the following is a specification.

This invention relates to the manner of mounting the frame or gate of a gang or muley saw such as is used for cutting up logs into boards, and my improvement is directed to the suspension of the slides in which the saw frame is vertically reciprocated whereby the saw frame at the upper end of its stroke recedes from the log feed in a manner to avoid the log advancing against the saws while they are traveling at a slow rate of speed as the crank passes over the upper quarter of its movement.

In gang saws of this class the frame of saws is withdrawn from the cutting face during the upstroke to clear the saws from the cut and permit the sawdust to fall clear. The saw frame is usually vertically reciprocated by a crank and while the crank pin is passing around the upper quarter of its movement the saws are moving slowly while the log is advancing and a heavy strain is thus imposed upon the saws. Where the saw is for small logs this fault may be avoided by an intermittent feed of the log but in large logs it is obviously inconvenient to have an intermittent feed and it is therefore desirable to provide some means whereby the saw frame will recede before the advance of the log during that portion of the downward movement of the saw frame while the crank pin is passing over the upper quarter of its circle. It is to effect this object that the invention which is the subject of this application has been devised.

The invention is particularly described in the following specification, reference being made to the drawings by which it is accompanied, in which—

Figure 1 is an elevation of a portion of a gang saw frame showing its connection to the main frame of the machine, and Fig. 2 a cross section on the line A A in Fig. 1 showing the manner of suspending and operating the slides in which the gang frame vertically moves.

The various parts of the mechanism by which the saw frame is withdrawn from and advanced toward the cutting face on the log are practically the same as at present used in the best gang saws for heavy logs.

The saw frame 2 in which the saws 3 are secured is vertically reciprocated in slides 8 by a crank 4 from a crank shaft 5. The slides 8 are suspended at their upper ends from the main frame 10 of the machine and their lower ends moved to and from the approaching log as required by a mechanism to be described.

The saw frame 2 is provided with slide blocks 6 at the top and bottom of each side which slide blocks are pivotally mounted on pins 7 projecting from the sides of the saw frame that the frame may retain its vertical position during the moving of the slides. The lower ends of the slides are moved to and from the face of the cut by an eccentric 15 on the crank shaft 5 which eccentric is connected by a rod 17 to a lever 16 secured on an upper rocker shaft 13 on which is secured at each side a bell crank 12 one arm of which is connected by a link rod 11 to the lower end of each upper swinging slide 8. The other arm of the bell crank 12 is connected by a link rod 14 to a corresponding bell crank on the lower rocker shaft 13 by which the same movement is imparted to the lower swinging slides. The eccentric 15 is set at somewhat over ninety degrees in advance of the crank so that when the crank is at the upper end of its movement the lower ends of the slides 8 will be in the position shown in the drawing that is moving toward the face of the log. This however is not material to the principle of the invention although it is conducive to its more correct working, the essential feature of the invention lying in the location of the pin 9 on which the slides are suspended, at a position below the center 7 of the slide blocks when they are at the upper limit of their movement. The object of which is that when the lower end of each slide is moved towards the cutting face of the log in the direction of the arrow shown, the upper end, where the slide blocks of the saw frame are, is receding from the log, so while the saws are moving slowly at the upper end of the stroke the frame will move back before the advance of the log until in its descent the slide blocks 6 pass the point of suspension 9 of the guides when they will advance toward the cut in the desired manner.

The eccentric rod 17 is connected to the rocker arm 16 by means of a die 18 in an elongated slot 19 so that the amount of advance and recession of the saw frame may be regulated to the rate of feed of the logs. This adjustment may be effected by a screw and hand wheel as drawn but will preferably be coöperative with the mechanism by which the feed of the log is regulated so that in varying one the other will be correspondingly varied. This coöperative mechanism is not shown in the drawing as it is not material to the invention, which consists essentially in the location of the point of suspension of the guides 6 in the manner before described. The distance of this point of suspension from the center of the guide blocks when they are at the upper end of their movement should be approximately the versed sine 20 of the arc of the upper quarter of the movement of the crank pin as shown in the lower part of Fig. 2. With this proportion the downward line of movement of the saws in relation to an advancing log is practically a straight line. With this movement properly adjusted there is no lost motion but as soon as the frame commences its downward movement the saws meet their cut with a feed properly proportioned to the speed of descent.

The improvement is one that involves no extra expense as it consists merely in the altered position of the point of suspension of the slides.

Having now particularly described my invention I hereby declare that what I claim as new and desire to be protected in by Letters Patent is:

1. In a gang saw having a saw carrying frame that is vertically reciprocated by a crank, means for withdrawing the saw frame from the face of the cut on a log during the early part of the downward stroke of the saw frame, and for thereafter advancing it toward the cut while maintaining said saw frame with the saws constantly in a vertical plane at right angles to the line of travel of the log.

2. In a gang saw having a saw carrying frame that is vertically reciprocated by a crank, means for withdrawing the saw frame from the face of the cut on a log during the early part of the downward stroke of the saw frame, for thereafter advancing it toward the cut, and that will during the upstroke withdraw the saw frame from the cut while maintaining said saw frame with the saws constantly in a vertical plane at right angles to the line of travel of the log.

3. In a gang saw having a saw carrying frame that is vertically reciprocated by means of a crank, means for withdrawing the saw frame from the face of the cut during the downstroke of the saw frame and advancing it thereto during the latter part of the stroke while maintaining the saw frame and the saws always in vertical planes and at right angles to the line of travel of a log, said means comprising, slides in which the saw frame vertically moves said slides suspended from the frame of the machine at a point below the upper end of the movement of the saw frame in the guides, and means for moving the lower ends of the guides toward the cut on the log during the downstroke and for withdrawing them therefrom during the upstroke.

4. In a gang saw having a saw carrying frame, a pair of upper and lower slides in which said jaw frame is vertically reciprocable, means joining said upper and lower slides to be moved in unison, means for pivoting said upper and lower slides to the machine frame, and means coöperating with said joining means for moving said slides on their pivots at times to withdraw the saw frame from the face of the cut on a log during the early part of the down stroke of the saw frame and for thereafter advancing it toward the cut while maintaining the saw frame with the saws constantly in vertical planes and at right angles to the line of movement of the log.

In testimony whereof I have signed my name to this specification in the presence of two subscribing witnesses.

JOHN WARREN BELL.

Witnesses:
A. G. WOOLSEY,
ROWLAND BRITTAIN.